Patented Mar. 20, 1951

2,545,612

UNITED STATES PATENT OFFICE 2,545,612

SULFUR-CONTAINING COMPOUNDS OF NEPTUNIUM AND A PROCESS FOR THEIR PREPARATION

Sherman Fried, Chicago, Ill., and Norman R. Davidson, Sierra Madre, Calif., assignors to the United States of America as represented by the United States Atomic Energy Commission No Drawing. Application August 7, 1947,
Serial No. 767,352

3 Claims. (Cl. 23—14.5)

This invention relates to sulfur-containing compounds of neptunium and a process for their preparation.

It is an object of this invention to provide new compounds of neptunium.

Another object of this invention is to provide a process for the production of sulfur-containing compounds of neptunium.

We have found that sulfur-containing compounds of neptunium, specifically neptunium oxysulfide and dineptunium trisulfide, can be prepared by contacting a neptunium compound of the group consisting of neptunium dioxide, neptunium hydroxide, and neptunium carbonate and mixtures thereof with a sulfiding agent at an elevated temperature. The sulfiding agent is selected from the group consisting of hydrogen sulfide, carbon disulfide and sulfur and mixtures thereof. The temperature of the reaction is suitably maintained between 700 and 1500° C.

In one embodiment of the invention the contacting at the elevated temperature is carried out for a short period of time in order to prepare, as the sulfur-containing compound of neptunium, neptunium oxysulfide. The contact time varies inversely with the temperature. At a temperature of 1000 to 1100° C. a suitable period of time is 1 to 3 hours for a high yield of the desirable neptunium oxysulfide. Using a contact time of less than one hour, a lower yield of neptunium oxysulfide is obtained.

The amount of sulfiding agent used is preferably at least the stoichiometric amount and to insure a high degree of conversion a considerable excess of sulfiding agent is used. When mixtures of the sulfiding agents are used, the ratio of the agents can be varied broadly. A mixture of hydrogen sulfide and carbon disulfide is preferred.

In a second embodiment of the present invention dineptunium trisulfide is produced by contacting a neptunium compound of the group consisting of neptunium dioxide, neptunium hydroxide, and neptunium carbonate and mixtures thereof with the sulfiding agent of the invention at an elevated temperature, preferably between 700 and 1500° C. to form neptunium oxysulfide and it is contacted with either the same or a different sulfiding agent of this invention at an elevated temperature, preferably between 700 to 1500° C. Thus, dineptunium trisulfide is produced by contacting a neptunium compound of the group consisting of neptunium dioxide, neptunium hydroxide, and neptunium carbonate and mixtures thereof with a sulfiding agent at an elevated temperature and for a prolonged period of time, for example, at least 5 hours. In this embodiment, as well as in the first embodiment, the preferred starting neptunium compound is neptunium dioxide. Also, greater than the stoichiometric amount of sulfiding agent is preferably used and the preferred sulfiding agent is a mixture of hydrogen sulfide and carbon disulfide, the ratio of which may be varied over a wide range. A suitable contact time is between 10 and 14 hours when the temperature is 1000 to 1100° C.

In another embodiment dineptunium trisulfide is produced by contacting neptunium oxysulfide at an elevated temperature with a sulfiding agent of the group described above. The preferred temperature is between 700 and 1500° C.

The products of this invention, namely, neptunium oxysulfide and dineptunium trisulfide, are useful as refractory materials.

The following examples illustrate these embodiments of the invention.

*Example I*

Fifty micrograms of neptunium dioxide was placed in a quartz microcone and the latter was placed in a quartz boat within a horizontal quartz tube. Hydrogen sulfide gas, dried by passage over phosphorus pentoxide, was bubbled through liquid carbon disulfide in a vessel that was at about 30° C. The resultant gaseous mixture of hydrogen sulfide and carbon disulfide was passed through the quartz tube and over the neptunium compound, while the temperature within the tube was maintained at 1000 to 1050° C. This procedure was maintained for 2 hours and a black, brittle product was formed. After cooling the product was removed, broken up and placed in a capillary. It was identified by means of its X-ray diffraction pattern as containing at least 90% neptunium oxysulfide (NpOS). It was tetragonal with 2 molecules per unit cell and isomorphous with uranium oxysulfide (UOS). Its lattice dimensions were:

$$a_1 = 3.817 \pm 0.002 \text{ Å}$$
$$a_3 = 6.641 \pm 0.010 \text{ Å}$$

The calculated density was $\rho = 9.71$. Each neptunium atom was bonded to 4 oxygen atoms with Np—O=2.33 Å and to 5 sulfur atoms at distances Np—S=2.88 and 2.98 Å.

*Example II*

The product of Example I was mixed with some neptunium dioxide. The mixture was placed in a quartz microcone and the latter placed in a quartz boat within a horizontal quartz tube. A mixture of hydrogen sulfide and carbon disulfide was prepared and passed through the quartz tube and over the mixture of neptunium oxysulfide and neptunium dioxide at 1050° C. as in Example I. This procedure was carried out for 12 hours. After cooling the product was removed, broken up and placed in a capillary. It was a black, brittle material and was identified by its X-ray diffraction pattern as dineptunium trisulfide ($Np_2S_3$). It was orthorhombic with 4 molecules per unit cell and isomorphous with diuranium trisulfide ($U_2S_3$). The lattice dimensions were:

$$a_1 = 10.6 \pm 0.1 \text{ Å.}$$
$$a_2 = 10.3 \pm 0.1 \text{ Å.}$$
$$a_3 = 3.85 \pm 0.05 \text{ Å.}$$

The calculated density was $\rho = 8.9$.

The chemistry of the neptunium-sulfur system seems to be intermediate in a rather interesting way between that of the uranium sulfides and that of the plutonium sulfides. The oxysulfide of neptunium is NpOS like UOS and differing from $Pu_2O_2S$. In the fully sulfided product, however, the oxidation state of the neptunium is reduced to three. When $U_3O_8$ is converted to a sulfide by $H_2S$ at 1300 to 1400° C. in a graphite system, the product is $US_2$, with some decomposition to $U_2S_3$. The $U_2S_3$ reverts to $US_2$ as the reaction product is cooled in $H_2S$. In such a reaction, $PuO_2$ is converted to $Pu_2S_3$. While $Pu_2S_3$ is presumably like $Ce_2S_3$ which is a "normal-valent" sulfide that does not show metallic conductivity, $U_2S_3$ is a "reduced" sulfide showing semi-metallic conductivity and $US_2$ is a "normal-valent" sulfide. Since $Np_2S_3$ was prepared under conditions such that in general "normal" rather than "reduced" sulfides are obtained, it is presumably a "normal-valent" sulfide. However, its crystal structure is isomorphous with that of the "reduced" sulfide, $U_2S_3$, rather than that of the "normal" sulfide, $Pu_2S_3$.

Although the examples have described experiments that were carried out on a small scale, it is to be understood that the process of the present invention is suitably carried out on a large scale and that the necessary equipment would be apparent to those skilled in the art.

While preferred embodiments of the present invention are described above, other modifications may be made without departing from the spirit and scope of the invention. Thus, this invention is not to be limited to the examples but it is to be limited only by the appended claims.

What is claimed is:

1. A process for production of neptunium oxysulfide having the formula NpOS, which comprises contacting neptunium dioxide with a mixture of hydrogen sulfide and carbon disulfide for a short period of time at a temperature between 700 and 1500° C.

2. The process of claim 1 wherein the time of contact is between 1 and 3 hours and the temperature is 1000 to 1100° C.

3. As a composition of matter, neptunium oxysulfide having the formula NpOS.

SHERMAN FRIED.
NORMAN R. DAVIDSON.

REFERENCES CITED

The following references are of record in the file of this patent:

UNITED STATES PATENTS

| Number | Name | Date |
|---|---|---|
| 2,038,599 | Pier et al. | Apr. 28, 1936 |

OTHER REFERENCES

Mellor—Comprehensive Treatise on Inorganic and Theoretical Chemistry, volume 12, Longmans, Green and Company, New York, (1932), pages 94–6.

Seaborg—Chemistry and Engineering News, volume 23, No. 23, December 10, 1945, pages 2190–2.

Fried et al., The Basic Dry Chemistry of Neptunium, MDDC—1332, pages 13 and 14, July 18, 1947.